United States Patent Office 3,301,098
Patented Jan. 31, 1967

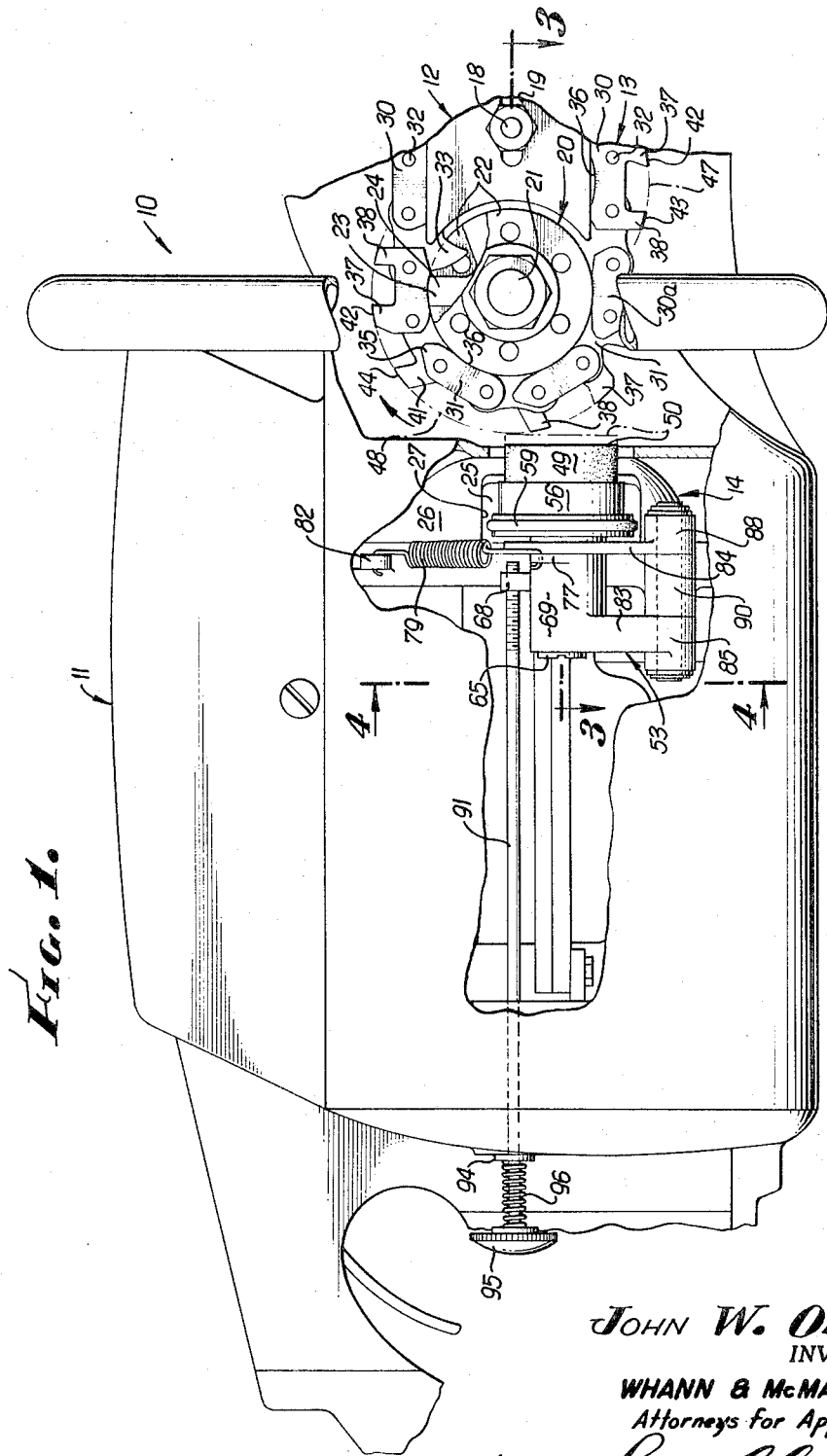

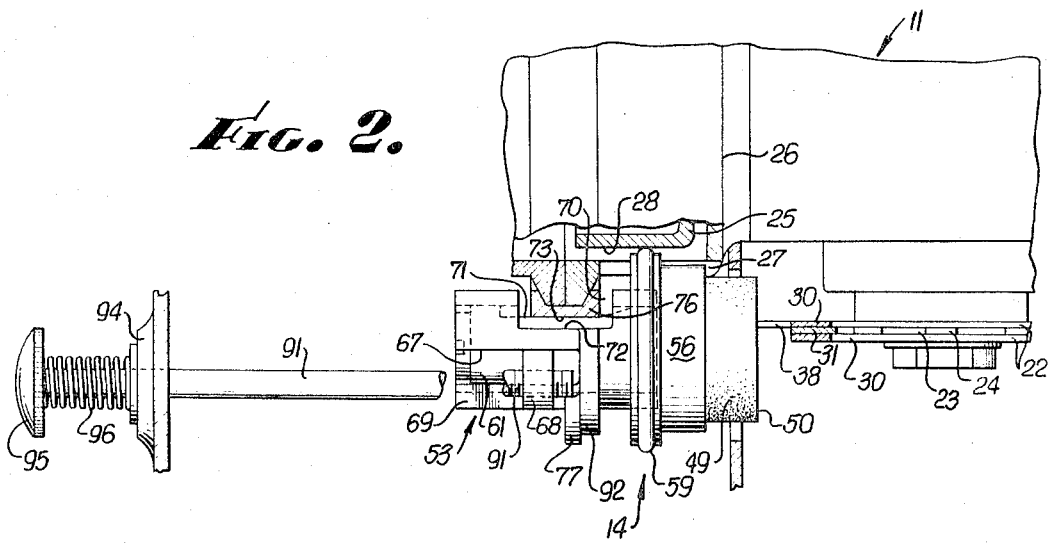
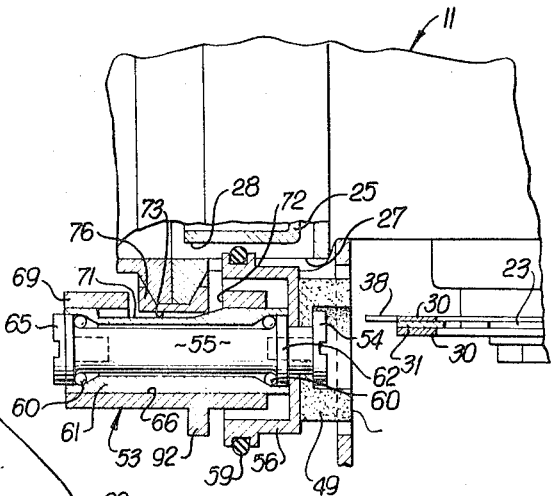
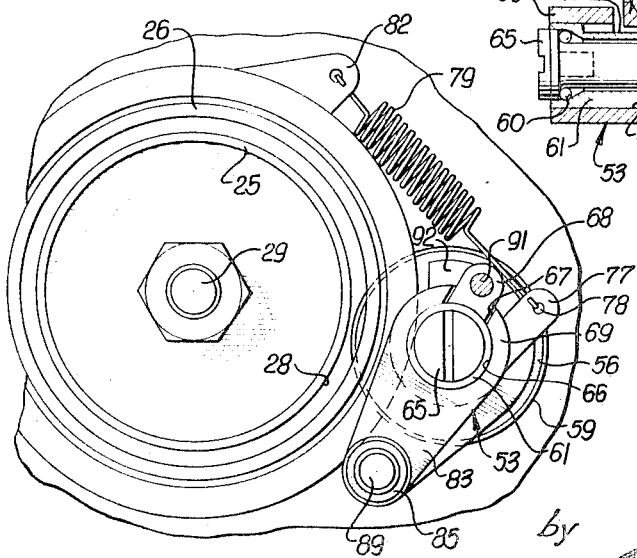

3,301,098
CHAIN SAW WITH SHARPENING WHEEL
John W. Oehrli, Pacific Palisades, Calif., assignor to McCulloch Corporation, Los Angeles, Calif., a corporation of Wisconsin
Filed Nov. 8, 1962, Ser. No. 236,256
The portion of the term of the patent subsequent to June 30, 1981, has been disclaimed
8 Claims. (Cl. 76—37)

This invention relates to means for sharpening saw chains and, more particularly, to sharpening means on a chain saw for sharpening the cutting elements on the saw chain during normal engine and cutting operation.

This application is co-pending with my application entitled Sharpening Means for Chain Saws, Serial No. 60,-451, filed October 4, 1960, in which a saw bar with an enlarged outer nose is disclosed for use in combination with a saw chain sharpening means on the housing, the outer nose being enlarged relative to the driving sprocket to provide trailing clearances on the cutters to permit boring operations. The same effect can be provided by the present invention by having the outer bar nose of larger diameter than the driving sprocket.

It is an object of the present invention to provide an improved means for sharpening saw chains.

It is another object of the invention to provide means to sharpen saw chains accurately and efficiently and, in general, to obtain better sharpening results than were heretofore possible.

It is still another object of the present invention to provide sharpening means for saw chains to maintain the cutting elements in their optimum sharpened conditions.

It is a further object of the present invention to provide means to sharpen the cutting edges of the saw chain and to correspondingly, accurately reduce the length of the depth gauges on the chain while sharpening during normal cutting operations.

It is a still further object of the present invention to provide sharpening means for a saw chain that will sharpen the cutting edges more accurately than can be done by using a hand file. That is, the present invention permits an unskilled operator to obtain better sharpening results than those that can be obtained by an expert tool maker using a file or grinding wheel not on the chain saw.

It is another object of the invention to provide sharpening means on a saw chain that will sharpen the saw chain cutting elements and reduce the length of the depth gauges where the cutting elements and depth gauges are much harder than file hardness. By making the cutting elements and depth gauges harder than those that can be sharpened with a file, the life of the saw chain is greatly prolonged.

It is still another object of the invention to provide a sharpening stone on a chain saw and which is dressed automatically during the sharpening operation so as to not require typical stone dressing.

It is a further object of the present invention to provide a sharpening means for chain saws to be used in cooperation with a drive mechanism and chain which functions to hold the chain in a constant radial position so that the cutting elements all pass through the same position of an arc and thereby be sharpened the proper amount by a grinding wheel movable into tangency at said position on the arc.

It is a still further object of the present invention to provide on a chain saw engine frame a grinding wheel which can be moved from a non-sharpening position to a sharpening position where its sharpening surface is on a point of an arc on which the cutting edges and outer surfaces of the depth gauges travel.

It is another object of the present invention to provide a grinding wheel on a chain saw engine whereby the wheel is rotatable in sharpening contact with the saw chain in a plane or path perpendicular to the path or plane of the saw chain as it travels on the sprocket and saw bar.

It is still another object of the present invention to provide a sharpening means on a chain saw engine for sharpening cutting elements of the saw chain during cutting operations, said cutting elements being of different lengths extending outwardly from the horizontal plane of the saw chain extending through the horizontal hinge axes of the links.

It is a further object of the invention to provide a grinding wheel on a chain saw engine and which is rotated by the saw chain as it makes the sharpening contact with the flat face of the wheel, the latter rotating in a plane perpendicular to the path of the saw chain.

Further objects and advantages of the invention may be brought out in the following part of the specification, wherein small details have been described for the competence of disclosure, without intending to limit the scope of the invention which is set forth in the appended claims.

Referring to the accompanying drawings, which are for illustrative purposes only:

FIG. 1 is a fragmentary, partially cut away side elevational view of a chain saw embodying the present invention;

FIG. 2 is a fragmentary, partially cross sectional plan view of the chain saw in FIG. 1;

FIG. 3 is a fragmentary cross sectional view, taken as indicated by the line 3—3 of FIG. 1; and FIG. 4 is a fragmentary end view, taken as indicated by the line 4—4 of FIG. 1.

Referring again to the drawings, there is illustrated a chain saw, generally designated as 10, having an engine frame portion or housing 11, a bar or blade 12, a saw chain 13 which is driven by the engine and which travels on the bar, and a sharpening mechanism, generally designated as 14, secured on the engine housing.

The bar 12 is adjustably secured to the engine frame 11 by bolts 18 on the frame extending through a slot 19 in the bar. The bar is of the grooved-type, having an unshown groove extending around its peripheral edges outwardly of the engine frame.

The chain is driven on the bar by a sprocket assembly, generally designated as 20, secured to an engine driving shaft 21. The sprocket assembly is comprised of two axially aligned discs 22, spaced by a sprocket 23 sandwiched therebetween having teeth 24.

As shown in the drawings, there is a chain saw engine clutch drum 25, mounted for rotation within an enlarged diameter, cylindrical frame portion 26, which has an opening 27 in its cylindrical wall to expose outer circumferential surface 28 of the drum. The driving shaft 21 is driven by the clutch drum, having a shaft 29, shown in FIG. 4, in a geared relationship with the shaft 21 so as to drive the latter. The clutch drum is caused to rotate when it is properly engaged in a conventional manner with the unshown drive shaft of the chain saw engine.

As shown in FIGS. 1–3, the endless saw chain 13 includes side links 30 and center links 31 connected consecutively by pintles 32. Extending inwardly of the chain on the center links 31 are sprocket-engaging projections or tangs 33 adapted to ride in the groove of the bar 12 and to fit in the pockets between the teeth 24 of the sprocket 23.

On the inner surfaces of the forward ends of the side and the center links are extensions 35 disposed longitudinally forwardly of the pintles 32 and the tangs 33. Each extension 35 is limited longitudinally to permit clearance with the trailing portion of the next link forwardly and contacts the outer circumferential surfaces of the sprocket teeth 24 or of the discs 22, depending upon whether it is a center or side link, respectively, as the chain moves from the lower portion of the bar to engage the sprocket assembly. It should be noted that the contacts of the extensions with the circumferential surfaces of the sprocket teeth and discs occur before the extensions reach the vertical diameter through the sprocket assembly and which is substantially perpendicular to the path of the chain at the point where the line of direction of the chain would form a tangent at the lowest point on the sprocket assembly. The contact of the extensions 35 on the lower circumferential surfaces of the sprocket assembly limits the vertical movement of the side and center links on the sprocket so as to provide a smooth and constant positioning of the chain on the sprocket and to properly position the cutting elements for sharpening. By having the chain enter engagement with the sprocket in this manner, teetering on meshing is prevented and the wear which occurs as the result of teetering in a conventional chain between the frictionally engaging parts is also limited.

To further aid in properly positioning the chain radially on the sprocket assembly, each side link 30 has a longitudinally arced, inwardly facing surface 36. The arced surfaces 36 have the same radii as the discs 22 and the sprocket wheel 23, and when the side links move onto the sprocket to the position shown by the link 30a at the lower portion of the sprocket in FIG. 1, the center of the arcs 36 and the center of the sprocket assembly 20 become coincident, the surfaces 36 riding on the circumferential surfaces of the discs 22 so as to maintain the chain links concentric, after the initial meshing, with the sprocket assembly in a constant radial position with non-teetering movement. Since the chain on the sprocket assembly remains in a constant radial position after the first tooth 30a is engaged, there is no vibration and little wear in the chain and sprocket so as to thereby provide a very smooth running chain.

As shown in FIG. 1, side cutter elements 37 extend vertically outwardly, when the bar 12 is in the vertical position as shown in FIG. 1, from selected side links, and spaced forwardly thereon are depth gauges 38. Similarly, on selected center links are center cutter elements 41.

The outer surfaces 42 of the side cutting elements 37, the outer surfaces 43 of the depth gauges 38, and the outer surfaces 44 on the center cutter elements 41 are curved and lie on arcs 47, shown in the lower portion of the chain in FIG. 1, of equal radii, the centers of which are on an unshown line, perpendicular to the horizontal center plane through the pintles 32, and extending midway between the axis of each pair of pintles so that the vertical distance to the outer surfaces of the cutting elements and depth gauges from the horizontal plane is determined by the longitudinal distance from the aforesaid unshown line and the axes of the pintles. In other words, for example, the outer surfaces 42 forwardly at the cutting edges of the side cutters are the same vertical distances from the horizontal plane through the pintles and, therefore, are the same horizontal distances from the axes of the respective pintles of the selected side links. Similarly, depth gauges 38 are shown to be shorter than the side cutters 37 and, therefore, have their outermost point on the arc 47 nearer to an axis of a pintle than do the side cutters 37. In the embodiment shown, the center cutters 41 are approximately of the same vertical length as the side cutters.

The particular arrangement of the cutting edges and depth gauges, all being on arcs 47 of equal radii, and when rotated on the sprocket assembly are maintained in a constant radial position, having their outer surfaces 42, 43 and 44 on an arc 48 whose center is at the center of the arcs 47 and the center of the sprocket assembly 20. This makes it possible to sharpen the chain with a grinding wheel 49 of the sharpening mechanism 14 as each outer surface of each cutter and depth gauge contacts the flat face surface 50 of the grinding wheel at the same distance from the center of the arcs 47 and 48. This provides a much better way of sharpening than the use of an individual file, both in regard to speed and to accuracy. In addition, it permits the cutting teeth and depth gauges to be made harder than they can be made when the sharpening must be accomplished by a file in the conventional manner.

As shown in the drawings, the grinding wheel 49 of the sharpener mechanism 14 is supported for rotation and axial movement in a pivotal holder or member 53. As may be best seen in FIG. 3, the grinding wheel 49 has a central recession extending inwardly from front face 50 for the reception of cap screw 54 which secures the grinding wheel to a shaft 55 with a driving wheel 56 therebetween. The driving wheel 56 is cup-shaped and has in its outer periphery an annular groove containing an O-ring 59 which is adapted to be moved into contact with the outer surface 28 of the clutch drum 25 so as to drive the driving wheel 56 and, in turn, the grinding wheel 49.

The shaft 55 is mounted to rotate on ball bearings 60 providing radial and thrust support for the shaft within the sleeve or supporting member 61. Inwardly of the driving wheel is a shaft flange or washer 62 holding the right-hand end bearings in place, and along with cap screw 65 at the other end of the sleeve, holding the shaft within the sleeve 61. By this arrangement, the shaft is permitted to move axially within the sleeve only to the extent of the bearing tolerances.

The sleeve or supporting member 61 is slidably engaged in a cylindrical opening 66 on the pivotal holder or member 53 so that the sleeve and shaft may be moved axially so as to position the grinding wheel face 50 in the sharpening position shown in FIG. 2 and the non-sharpening position shown in FIG. 3.

Extending upwardly and outwardly from the sleeve or supporting member 61, and through the longitudinal slot 67 in an upper portion of cylindrical wall 69 of pivotal holder or member 53, is an ear 68 by which the sleeve and grinding wheel may be moved in the axial directions. In the sleeve wall facing the housing, as shown in FIGS. 2 and 3, is a recessed portion formed by a slanted flat cam surface 70 and an axially directed flat cam surface 71. Radially outwardly of these cam surfaces, in the direction toward the chain saw housing 11, is an opening 72 in the cylindrical wall 69 of the pivotal holder or member 53, provided so that the cam surfaces can ride on an outer flat surface 73 of a protruding rib or web member 76 of the housing 11.

Extending angularly outwardly from the pivotal member 53 is an ear 77, best seen in FIG. 4, having an opening 78 to receive one end of spring 79. The other end of spring 79 is similarly connected to an ear 82 secured to the engine housing.

As may be best seen in FIGS. 1 and 4, extending downwardly from the cylindrical wall portion 69 of the pivotal member 53 are spaced legs 83 and 84, having at their lower ends hinge eyes 85 and 88, respectively, which by means of a pin 89 extending through them, and hinge eye 90, secured to the housing, the member 53 is pivotally mounted on the housing. The spring 79, thus, biases the upper end of the member 53 toward the housing and the clutch drum so that the cam surface 70 is in contact with the corner or end of the flat surface 73 on the web member 76 when the grinding wheel is in the non-sharpening position, as shown in FIG. 3, the sleeve and shaft members being in their leftward positions, and the O-ring 59 being spaced from the outer circumferential surface 28 of the clutch drum 25.

In FIG. 2, the grinding wheel is shown to be in its sharpening position where the face 50 has one point thereof tangent to the arc 48, the wheel 49 being rotatable in a plane or path perpendicular to the plane or path of the chain on the sprocket, as indicated in FIG. 1. In this position, the flat cam surface 71 is in contact with the flat face of the surface 73 in that the upper end of the pivotal holder or member 53 has been moved inwardly toward the housing whereby the O-ring 59 on the driving wheel has been moved into contact with the outer surface of the clutch drum, as shown in FIG. 2, so that the rotating clutch drum of the engine drives the grinding wheel. Thus, its is clear that as the sleeve or supporting member 61 is moved axially toward the right so that the grinding wheel is moved into its sharpening position, as the result of the cam action, the upper end of the pivotal holder or member 53 is moved inwardly toward the housing by means of the spring 79 so that driving engagement is made by the O-ring 59 and the clutch drum 25.

In order that the grinding wheel 49 may be easily moved into the sharpening position, an actuating rod 91 is provided. The rod 91 has its inner end threadedly engaged in the ear 68, extending from the sleeve or supporting member 61. Movement of the sleeve and wheels to the right is limited by a stop flange 92 on the holder or member 53 so that the location of the rod end in the ear provides a means for adjustment of the sharpening position of the wheel face 50. Rotation of the rod in the ear will change the adjustment.

The rod is horizontally and slidably supported adjacent its other end in a housing wall at 94. On the outer end of the rod 91 is a flange or knob 95 by which the operator of the chain saw may move the grinding wheel into the sharpening position. Surrounding that portion of the rod which extends outwardly of the housing is a coil spring 96 which holds the grinding wheel in its non-sharpening position and causes the grinding wheel to be moved to the latter when the chain saw operator releases the knob so that it is free to move away from the housing.

By having the grinding wheel rotatable by the clutch drum the face 50 is automatically and continuously dressed so that it is always in condition for operation and need not be otherwise dressed.

It should be noted that the O-ring 59, made of typical elastomeric material, gives the driving wheel flexibility so that it can accommodate any eccentricity of the clutch drum. Further, the driving wheel 56, because of the elastomeric material in the O-ring, can be held tightly against the clutch drum by the spring 79 to provide a better frictional contact between the two than would otherwise be possible without the flexibility provided in the said material. Another advantage provided by the elastomeric material is that it permits the wheel to run cooler and there is less tendency of it to fly apart when running against an eccentric surface of a warped clutch drum.

To sharpen the cutting elements of the saw chain 13 and to correspondingly grind down the depth gauges, the driving shaft 21 must be driving the sprocket assembly 20 so as to move the saw chain over its regular path which is perpendicular to the plane of the grinding wheel face 50, and the sharpening may be accomplished when the saw chain is moving or is actually cutting.

The positioning of the front face 50 of the grinding wheel by means of pressure applied to the rod 91 by the knob 95 determines the radius of the arc 48 or, in other words, the amount of grinding and sharpening that is to occur on the depth gauges and on the cutting edges, respectively. This, of course, is limited by the position of the end of the rod 91 in the ear and by the stop flange 92. It should be noted that each sharpening operation occurs in a very short period.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specific form shown or uses mentioned, except as defined in the accompanying claims, wherein various portions have been separated for clarity of reading and not for emphasis.

I claim:

1. In an engine driven chain saw having an endless saw chain driven by a driving sprocket and around a saw bar, said engine being in a housing, cutting elements extending outwardly from said chain and radially outwardly from said sprocket on that portion of the chain thereon, said cutting elements having cutting edges on the outermost portions thereof and traveling in a path in an arc around said sprocket, saw chain cutting element sharpening means on said chain saw adjacent the chain driving sprocket for sharpening said chain during normal engine and cutting operation, said sharpening means comprising:
  (a) a supporting member pivotally mounted on said housing,
  (b) said member being biased toward said housing;
  (c) a grinding wheel on a rotatable shaft bearing mounted within said member and rotatable in a plane perpendicular to the path of the cutting elements,
  (d) said grinding wheel, said shaft and supporting member being slidably movable within said pivotal member so that said wheel is movable into and out of a sharpening contact occurring on a point on said arc around said sprocket;
  (e) means on said chain saw adjacent said housing to slidably move said shaft so as to place said grinding wheel at said sharpening contact point with said cutting edges;
  (f) spring means on said last means to bias said grinding wheel out of sharpening contact with said cutting edges; and
  (g) means adjacent said housing operable to rotate said grinding wheel when it is in position at said sharpening contact point and said member is biased toward said housing.

2. In an engine driven chain saw having an endless saw chain driven by a driving sprocket and around a saw bar, said engine being in a housing, cutting elements extending outwardly from said chain and radially outwardly from said sprocket on that portion of the chain thereon, said cutting elements having cutting edges on the outermost portions thereof and traveling in a path in an arc around said sprocket, saw chain cutting element sharpening means on said chain saw adjacent the chain during sprocket for sharpening said chain driving normal engine and cutting operation, said sharpening means comprising:
  (a) a grinding wheel on and rotatable with a shaft bearing mounted within a supporting member, said grinding wheel being rotatable in a plane perpendicular to the path of the cutting elements and cutting edges,
  (b) said supporting member being slidably engaged in a pivotal member pivotally mounted to said housing;
  (c) means to bias said pivotal member toward said housing,
  (d) grinding wheel, said shaft and supporting member being slidably movable within said pivotal member so that said wheel is movable into and out of a sharpening contact position with said cutting edges, said sharpening contact occurring on a point on said arc around said sprocket;
  (e) means on said chain saw adjacent said housing to slidably move said supporting member and said shaft so as to place said wheel in said sharpening contact position;

(f) spring means on said last means to bias said grinding wheel out of sharpening contact with said cutting edges; and
(g) means within said pivotal member to permit it to be moved toward said housing by said means to bias when said wheel is moved into said sharpening contact position so that drive means within said engine engages means on said shaft to rotate it and said wheel.

3. In an engine driven chain saw having an endless saw chain driven by a driving sprocket and around a saw bar, said engine being in a housing, cutting elements extending outwardly from said chain and radially outwardly from said sprocket on that portion of the chain thereon, said cutting elements having cutting edges on the outermost portions thereof and traveling in a path in an arc around said sprocket, saw chain cutting element sharpening means on said chain saw adjacent the chain driving sprocket for sharpening said chain during normal engine and cutting operation, said sharpening means comprising:
(a) a grinding wheel on and rotatable with a shaft bearing mounted within a supporting member, said grinding wheel being rotatable in a plane perpendicular to the path of the cutting elements and cutting edges,
(b) said supporting member being slidably engaged in a pivotal member pivotally mounted to said housing;
(c) means to bias said pivotal member toward said housing,
(d) said grinding wheel, said shaft and supporting member being slidably movable within said pivotal member so that said wheel is movable into and out of a sharpening contact position with said cutting edges, said sharpening contact occurring on a point on said arc around said sprocket;
(e) means on said chain saw adjacent said housing to slidably move said supporting member and said shaft so as to place said wheel in said sharpening contact position;
(f) spring means on said last means to bias said grinding wheel out of sharpening contact with said cutting edges;
(g) driving means on said shaft to drive said wheel;
(h) cam means within said pivotal member to permit it to be moved toward said housing by said biasing means when said wheel is moved into said sharpening contact position; and
(i) means on said engine for engaging said driving means to rotate the same and said wheel when the latter is in said sharpening contact position.

4. In an engine driven chain saw having an endless saw chain driven by a driving sprocket and around a saw bar, said engine being in a housing, cutting elements extending outwardly from said chain and radially outwardly from said sprocket on that portion of the chain thereon, said cutting elements having cutting edges on the outermost portions thereof and traveling in a path in an arc around said sprocket, saw chain cutting element sharpening means on said chain saw adjacent the chain driving sprocket for sharpening said chain during normal engine and cutting operation, said sharpening means comprising:
(a) a grinding wheel on and rotatable with a shaft bearing mounted within a supporting member, said grinding wheel being rotatable in a plane perpendicular to the path of the cutting elements and cutting edges;
(b) a pivotal member pivotally mounted on said housing,
(c) said supporting member being fixed against rotation in said pivotal member and being slidably engaged therein to move in the axial direction of said shaft, said shaft being fitted to move axially with said supporting member;
(d) means to bias said pivotal member toward said housing,
(e) said grinding wheel being movable axially with said shaft into and out of a sharpening contact position with said cutting edges, said sharpening contact occurring on a point on said arc around said sprocket;
(f) means on said chain saw adjacent said housing to slidably move said supporting member so as to place said grinding wheel in said sharpening contact position;
(g) spring means on said last means to bias said grinding wheel out of sharpening contact with said cutting edges;
(h) a driving wheel on said shaft to drive said grinding wheel;
(i) an axially directed cam surface on said supporting member directed toward said housing and exposed thereto through an opening in said pivotal member,
(j) said cam surface having a recessed portion being biased into contact with said housing by said biasing means for said pivotal member when said grinding wheel is moved into said sharpening contact position so as to move said driving wheel toward said housing; and
(k) means on said engine for engaging said driving wheel to rotate the same when it is moved toward said housing and said grinding wheel is in said sharpening contact position.

5. In an engine driven chain saw having an endless saw chain driven by a driving sprocket and around a saw bar, said engine being in a housing, cutting elements extending outwardly from said chain and radially outwardly from said sprocket on that portion of the chain thereon, said cutting elements having cutting edges on the outermost portions thereof and traveling in a path in an arc around said sprocket, saw chain cutting element sharpening means on said chain saw adjacent the chain driving sprocket for sharpening said chain during normal engine and cutting operation, said sharpening means comprising:
(a) a grinding wheel on and rotatable with a shaft;
(b) a sleeve, said shaft being bearing mounted for rotation in said sleeve;
(c) a pivotal member pivotally mounted on said housing,
(d) said sleeve being fixed against rotation in said pivotal member and being slidably engaged therein,
(e) said shaft being fitted to move axially with said sleeve;
(f) means to bias said pivotal member toward said housing,
(g) said grinding wheel being movable axially with said shaft into and out of a sharpening contact position with said cutting edges, said sharpening contact occurring on a point on said arc around said sprocket;
(h) a rod on said housing connected to said sleeve to slidably move said sleeve and shaft so as to place said grinding wheel in a sharpening contact position;
(i) spring means on said rod to bias said grinding wheel out of sharpening contact with said cutting edges;
(j) a driving wheel on said shaft to drive said grinding wheel;
(k) a cam on said sleeve having an inner recessed portion directed toward said housing and exposed thereto through an opening in said pivotal member,
(l) the inner recessed portion of said cam being biased into contact with said housing by said biasing means for said pivotal member when said grinding wheel is moved into said sharpening contact position so as to move said driving wheel toward said housing; and
(m) means on said engine for engaging said driving wheel to rotate the same when it is moved toward said housing and said grinding wheel is in said sharpening contact position.

6. In a chain saw of the type having an endless saw chain driven by an engine, said engine supported in a housing; means supported on the housing to sharpen the cutting edges of the cutters on the saw chain in its path of travel during normal engine and sawing operation, said means to sharpen comprising:
  (a) a member supported adjacent said housing;
  (b) a grinding wheel on a shaft bearing mounted on said member and rotatable in a path perpendicular to the path of the cutters,
  (c) said shaft being slidably movable in said member so that said grinding wheel is movable into and out of sharpening contact with said cutting edges of said cutters,
  (d) said sharpening contact being made on a point of arc through which each cutting edge passes;
  (e) means adjacent said chain saw engine to rotate said grinding wheel to sharpen said cutting edges; and
  (f) means on said chain saw adjacent said housing to slidably move said shaft so as to place said grinding wheel in sharpening contact with said cutting edges and to operably connect same with the means to rotate said grinding wheel,
  (g) the connection between the means to rotate said grinding wheel and said grinding wheel being broken when said shaft is slidably moved in the opposite direction so as to move said grinding wheel out of sharpening contact with said cutting edges.

7. In a chain saw of the type having an endless saw chain driven by an engine, said engine being supported in a housing; means supported on the housing to sharpen the cutting edges of the cutters on said saw chain in its path of travel during normal engine and sawing operation, said means to sharpen comprising:
  (a) a member movably supported adjacent said housing;
  (b) a grinding wheel on a shaft bearing mounted on said member and rotatable in a path perpendicular to the path of the cutters,
  (c) said shaft being slidably movable so that said grinding wheel is movable into and out of sharpening contact with said cutting edges of said cutters,
  (d) said sharpening contact being made on a point of arc through which each cutting edge passes;
  (e) means including means adjacent said chain saw engine to rotate said grinding wheel to sharpen said cutting edges;
  (f) means on said chain saw adjacent said housing to slidably move said shaft so as to place said grinding wheel in sharpening contact with said cutting edges and simultaneously effect an operable connection between said grinding wheel and the means to rotate the grinding wheel; and
  (g) means for biasing said grinding wheel out of sharpening contact with said cutting edges and simultaneously effecting disconnection of said grinding wheel with said means to rotate said grinding wheel.

8. In a chain saw of the type having an endless saw chain driven by an engine, means on the chain saw adjacent the engine to sharpen the cutters on the saw chain in its travelling path during normal engine and sawing operation, said means to sharpen comprising:
  (a) a grinding member movable into and out of sharpening contact with the cutting edges of said cutters, said grinding member normally being idle,
  (b) said member being rotatable in said sharpening contact in a path perpendicular to the path of the cutters;
  (c) means adjacent said engine operable to rotate said grinding member when it is in position at said sharpening contact point; and
  (d) means on said chain saw adjacent the engine to move said grinding member into sharpening contact with said cutting edges and at the same time effect an operable connection with the means to rotate said grinding member,
  (e) said sharpening contact being made on a point of arc through which each cutting edge passes.

References Cited by the Examiner

UNITED STATES PATENTS

| 2,821,097 | 1/1958 | Carlton | 76—37 |
| 2,986,049 | 5/1961 | Spodobalski | 76—112 |
| 3,040,602 | 6/1962 | Carlton | 76—38 |
| 3,138,973 | 6/1964 | Muir | 76—37 |

FOREIGN PATENTS 1,179,606  12/1958  France.

GRANVILLE Y. CUSTER, JR, *Primary Examiner.*

H. J. GROSS, D. D. SCHAPER, *Assistant Examiners.*